Figure 1:
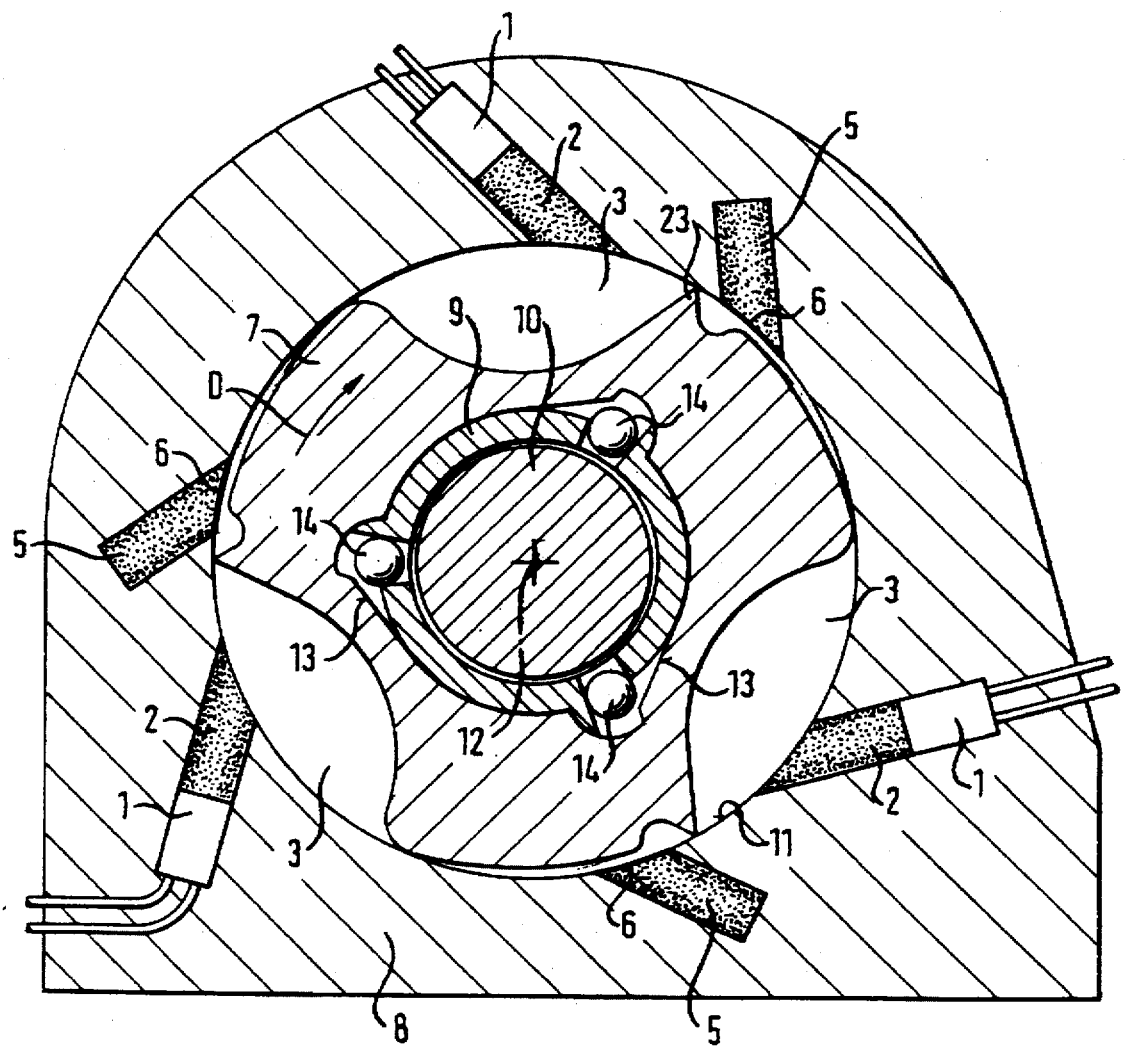

United States Patent [19]

Specht

[11] Patent Number: 5,681,004
[45] Date of Patent: Oct. 28, 1997

[54] APPARATUS FOR ROTATIVELY DRIVING A WINDING SHAFT OF A SAFETY BELT AUTOMATIC WINDING DEVICE

[75] Inventor: Martin Specht, Feldafing, Germany

[73] Assignee: TRW Occupant Restraint Systems GmbH, Alfdorf, Germany

[21] Appl. No.: 586,848

[22] PCT Filed: Apr. 12, 1995

[86] PCT No.: PCT/EP95/01364

§ 371 Date: Jan. 17, 1996

§ 102(e) Date: Jan. 17, 1996

[87] PCT Pub. No.: WO95/32108

PCT Pub. Date: Nov. 30, 1995

[30] Foreign Application Priority Data

May 19, 1994 [EP] European Pat. Off. ............ 94107777

[51] Int. Cl.$^6$ .................................................. B60R 22/46
[52] U.S. Cl. ........................................ 242/374; 280/806
[58] Field of Search ........................ 242/374; 280/806; 297/478, 480

[56] References Cited

U.S. PATENT DOCUMENTS

| | | | |
|---|---|---|---|
| 4,151,967 | 5/1979 | Lindblad | 242/374 |
| 4,230,288 | 10/1980 | Fohl | 242/374 |
| 5,351,485 | 10/1994 | Hiruta | 242/374 |
| 5,383,623 | 1/1995 | Hiruta et al. | 242/374 |
| 5,451,008 | 9/1995 | Hamaue | 242/374 |
| 5,485,970 | 1/1996 | Steffens | 242/374 |
| 5,505,399 | 4/1996 | Schmid et al. | 242/374 |

FOREIGN PATENT DOCUMENTS 4305596  2/1994  Germany.

OTHER PUBLICATIONS

Japanese Abstract JP61040421, Feb. 26, 1986.

Principles of the Wankel Engine by Ted Pipe, 1974.

Primary Examiner—John M. Jillions
Attorney, Agent, or Firm—Tarolli, Sundheim, Covell, Tummino & Szabo

[57] ABSTRACT

An apparatus for the rotary drive of a winding shaft of a safety belt automatic winding device, including a rotary member 4 mounted rotatably in a casing 8 and caused to be rotated by a plurality of propellant gas charges 2, 5 which are ignited successively, with the drive movement of the rotary member 4 being transmitted to the winding shaft 10 via clutch members 14.

21 Claims, 7 Drawing Sheets

APPARATUS FOR ROTATIVELY DRIVING A WINDING SHAFT OF A SAFETY BELT AUTOMATIC WINDING DEVICE

The invention relates to an apparatus for the rotary drive of a winding shaft of a safety belt automatic winding device, including an energy storing device, adapted to be triggered by a sensor means, a rotary member rotatable by the power storage means and a clutch by means of which the driven rotary member is to be engaged with the winding shaft.

The purpose is that by such an apparatus, in an emergency situation, for example, excessive velocity changes, e.g. in a crash event, prior to blocking the winding shaft, loosely superimposed belt layers on the winding shaft and belt looseness in the safety belt portion applied to the body of the vehicle passenger are removed. Thereby the risk of forward displacement of the body of the passenger is eliminated.

An object of the invention is to provide an apparatus which can be accommodated in a space-saving manner on the automatic belt winding means.

According to the invention, this is achieved in that the rotary member is rotatably accommodated in a casing, there being provided between the rotary member and an inner wall of the casing at least one explosion chamber which turns around an axis due to the rotation of the rotary member, which more particularly takes the form of an impeller or rotary piston, and wherein along the rotation trajectory of the explosion chamber a plurality of energy storage means in the form of propellant gas charges are provided which can be triggered once the explosion chamber has reached the respective locality of the propellant gas charge. The explosion chamber in the case of an impeller takes the form of a pressure space of constant volume and in the case of the rotary piston is formed as an expandable pressure space.

In this manner, a transmission is attained of the force generated in the diverse power storage means onto the winding shaft along the shortest and most direct pathway. In addition, it is possible to so proportion the driving force of the propellant gas charges that successively when igniting the propellant gas charges a progressively increasing thrust is applied onto the rotary member. It is avoided in this manner that at the start of rotation the torque applied by the rotary member is transmitted to the winding shaft in an abrupt manner. Rather, in the case of the invention, a continuously increasing torque is applied to the winding shaft within the brief time available.

The propellant gas charges may be ignited simultaneously.

Preferably the propellant gas charges are ignited successively, more particularly whenever the explosion chamber arrives at the respective locality of the propellant gas charge. For this purpose, each propellant gas charge may be associated with an ignition means which is brought to ignition, controlled by the revolving of the rotary member. However, advantageously the propellant gas charges are so designed in the successive stages that they are ignited by the temperature of the previously ignited propellant gas by auto-ignition. In this manner it is likewise possible to attain a progressively successive ignition of the individual propellant gas charges. A mechanical ignition of the successive propellant gas charges by the rotating rotary member is likewise possible.

In the rotary member a clutch actuating means may be provided. Clutch elements may be brought into a clutch engagement position in which a frictional connection is brought about between the rotary member and the winding shaft by way of the clutch elements, by way of these clutch operating means. The clutch operating means may be so designed that the movements of the clutch elements into the clutch engagement position is brought about by the rotation of the rotary member.

Figure 2:
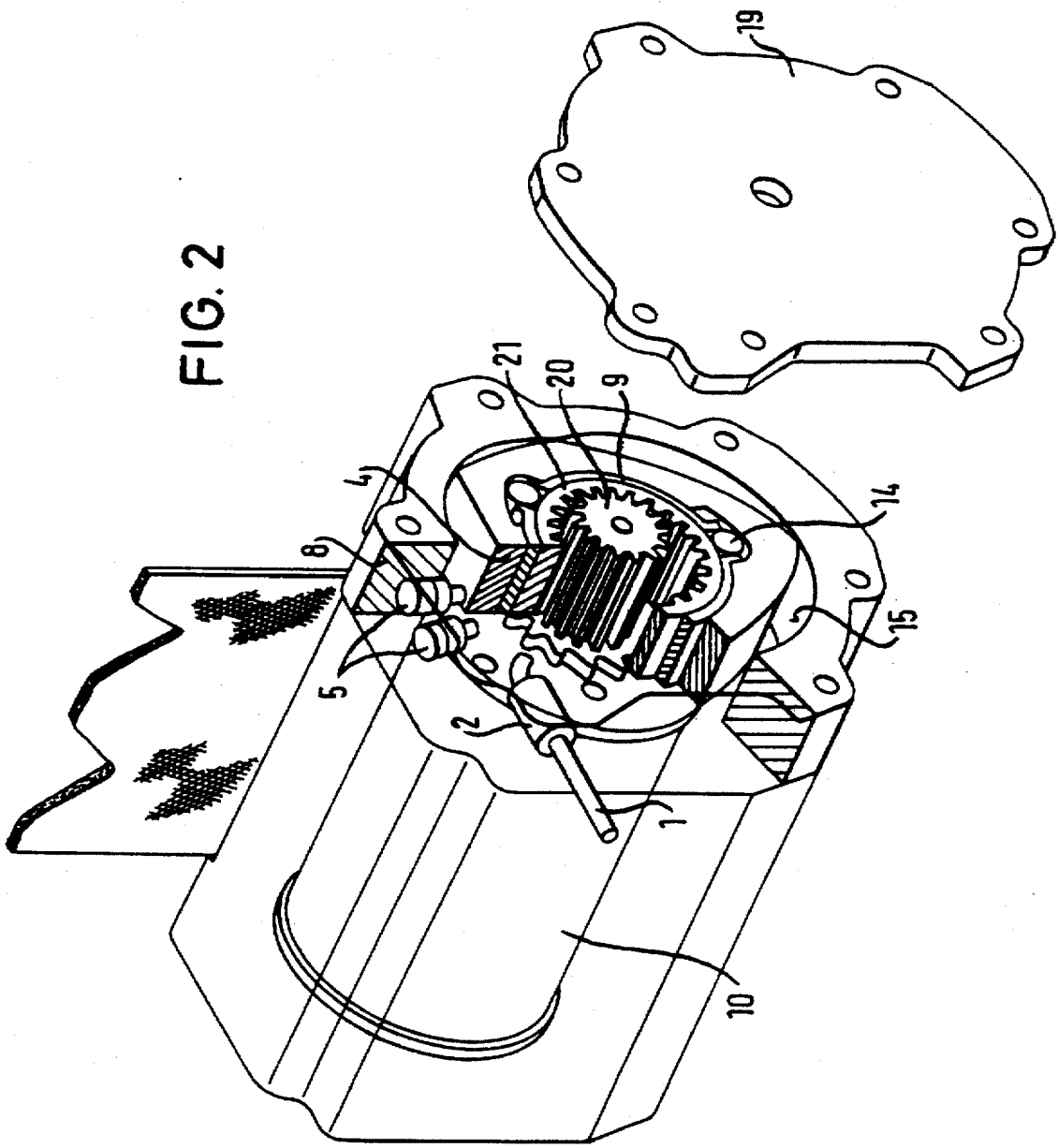
Figure 8:
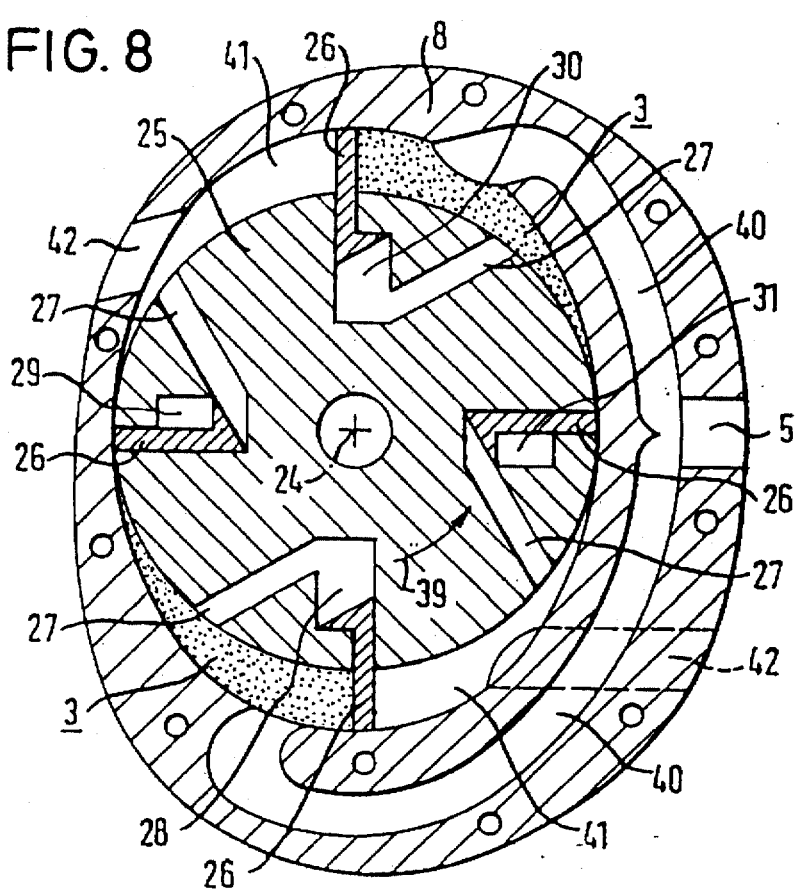
Figure 9:
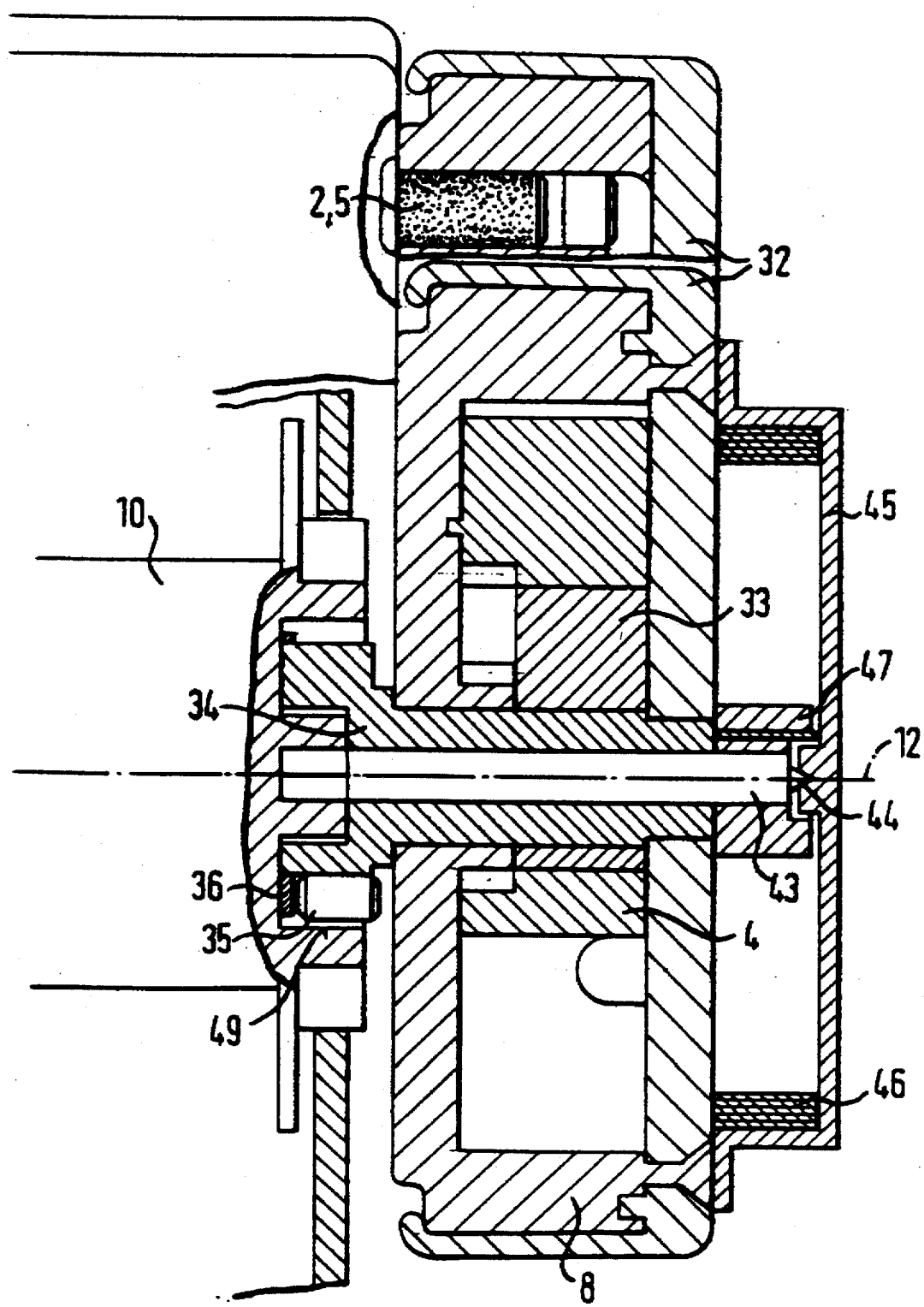
Figure 10:
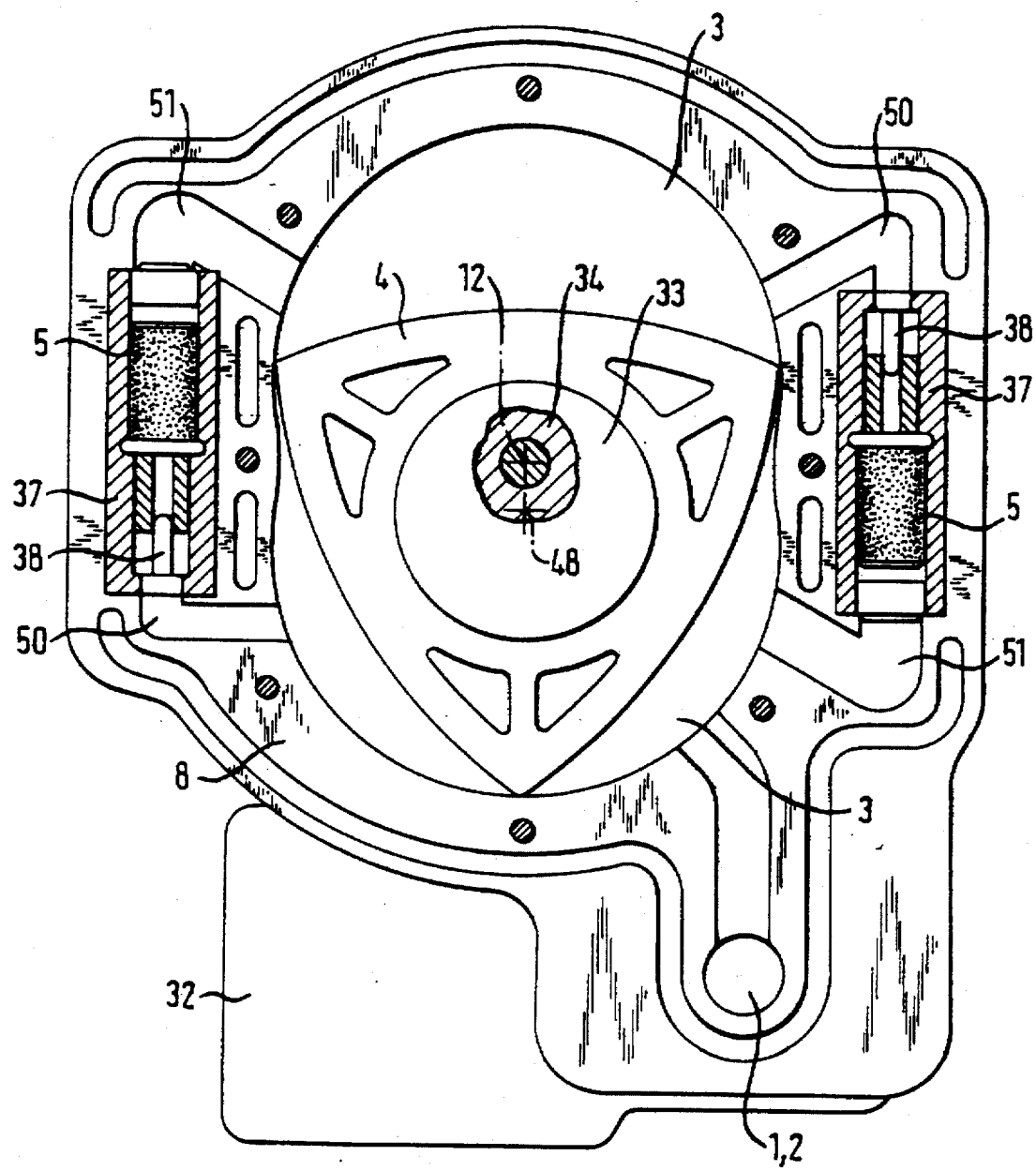

The invention will be further explained by way of working examples with reference to the drawings. There is shown in:

FIG. 1 schematically a working example including a rotary member which is driven like an impeller;

FIG. 2 in a perspective view, a drive means comprising a rotary piston;

FIGS. 3 to 7 in side elevation, various operating positions of the rotary piston drive according to FIG. 2;

FIG. 8 a further working example;

FIG. 9 a working example for a rotary piston drive including a clutch means by way of which the rotary piston drive can be engaged with the winding shaft; and FIG. 10 a side elevation of the working example illustrated in FIG. 9.

In the working example illustrated in FIG. 1 a rotary member 7, driven in accordance with the impeller principle, is rotatably mounted in a cylindrical cavity in a casing 8. The rotary member 7 is pivotally mounted circumferentially in relation to a cylindrical inner wall 11. In the illustrated working example the rotary member 7 is mounted co-axially in relation to the winding shaft axis 12. In the illustrated working example three recesses are provided on the circumference of the rotary member 7 which form explosion chambers 3. Along the periphery of the cylindrical inner wall 11 propellant charges 2 and 5 are provided in the direction of rotation (arrow D). The propellant charges 2 and 5, respectively are accommodated in cavities extending at an acute angle in relation to the cylindrical inner wall 11. The propellant charges 2 are provided with ignition means 1. These ignition means may, for example, be ignited electrically in a known manner. A propellant charge 2 which includes an ignition means 1 is followed by a propellant charge 5 in the direction of rotation. The propellant charge 5 is so adapted that it can be ignited by the temperature prevailing in the explosion chamber 3. In the illustrated working example there are in each case provided three sets of propellant charges. Instead of this arrangement a single propellant charge 2 including an ignition device 1 may be provided, followed at appropriate distances, by propellant charges 5 adapted for autoignition by the temperature prevailing in the explosion chamber 3. These propellant charges 5 are then distributed about the entire circumference of the cylindrical inner wall 11. In the illustrated working example it is possible to ignite the propellant charges 2 simultaneously. However, it is also possible to ignite the propellant charges 2 successively. In particular, if but a single explosion chamber 3 is provided, the respective propellant charges are successively ignited whenever the explosion chamber 3, during the rotation, arrives at the locality of the respective propellant charge. The explosion chamber 3 moves about a circular trajectory about the winding shaft axis 12. This circular trajectory is outwardly limited by the cylindrical inner wall 11. During this rotation the explosion chamber may increase in size.

The propellant charges 5 may be closed off by closure plugs 6. During the rotation, the closure plugs 6 are stripped off by a stripping edge 23 on the circumference of the rotary member 7 so that the temperature in the explosion chamber 3 acts on the propellant charges 5 to effect autoignition. The edge 23 may also act to provide a mechanical ignition of the propellant charge 5.

The rotary member 7 is of a hollow configuration. In its hollow interior a clutch is provided. The clutch includes a guide ring 9. In the guide ring clutch elements 14, in the form of spheres, are held in the normal position. The inwardly directed surface in the cavity of the rotary member 7 includes a clutch operating means 13 in the form of surfaces extending in a ramp-like fashion. As the rotary member 7 revolves, these ramp-like surfaces engage the clutch elements, acting as clutch operating means 13, and cause these to be radially pushed inwardly whereby they are brought into engagement with an axially extending extension member of the winding shaft 10. During this axial movement the clutch elements 14 are guided by the guide ring 9. This results in a frictional engagement between the winding shaft 10 and the rotary member 7 being established by way of the clutch elements 14. Instead of the spheres it is also possible for gripping jaws to be provided as clutch elements 14.

The rotary movement of the rotary member 7 is brought about by ignition of the propellant charge 2. During onward rotation of the rotary member 7 the successive charges 5 are ignited by autoignition so that a continuous drive of the rotary member 7 is brought about in the direction of rotation D. As previously explained, a plurality of propellant charges 5, distributed over the entire periphery of the casing interior, may be provided in subsequent stages. The ignition of the igniting means 1 proceeds by activation of a sensor device which is not shown in any detail and which reacts inertially sensitive to an excessive change of vehicle velocity.

As soon as the frictional engagement between the winding shaft and the rotary member has been brought about, a fixation means, not shown in detail, e.g. a predesigned fracturing locality by means of which the guide ring 9 in normal operation is held stationary in relation to the casing 8, is released. The guide ring 9 then jointly revolves when the winding shaft 10 is driven.

In the embodiment illustrated in FIG. 2 the rotary member takes the form of a rotary piston 4. An inner wall 15 in the casing 8 takes the form of a trochoid. The rotary piston, as will be seen from FIGS. 3 to 7, is in each case in contact against the inner wall 15 in three positions so that, as the piston rotates the respective explosion chamber 3 expands whereby an expansion space is formed in which the propulsion gas expands and effects the rotary piston rotation. The casing 8 is covered by a cover 19.

Figure 3:
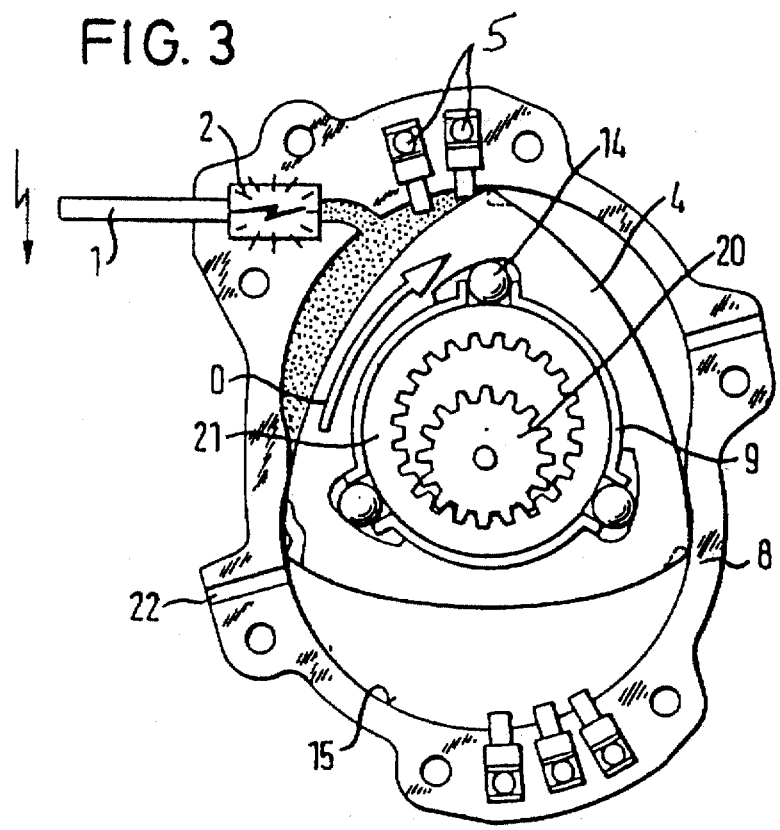
Figure 4:
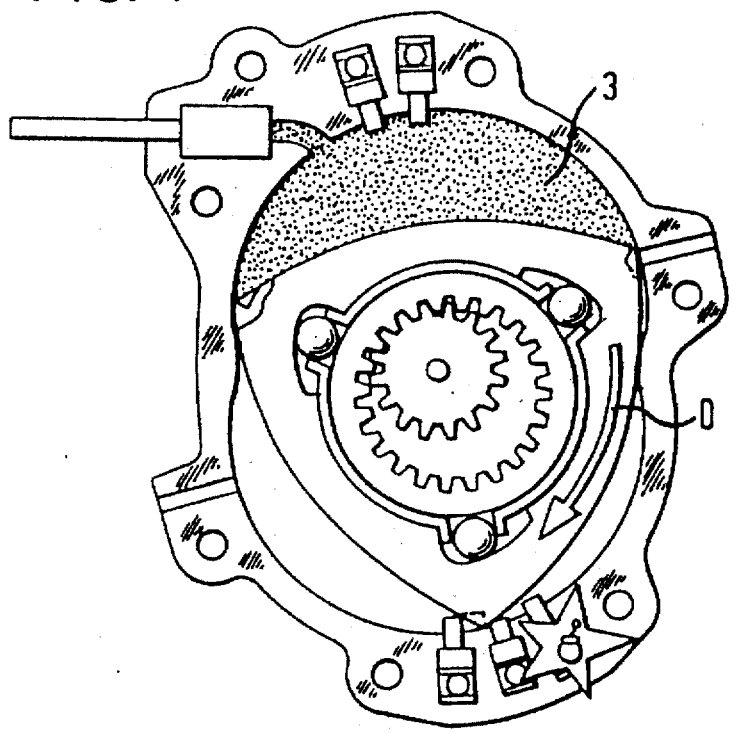
Figure 5:
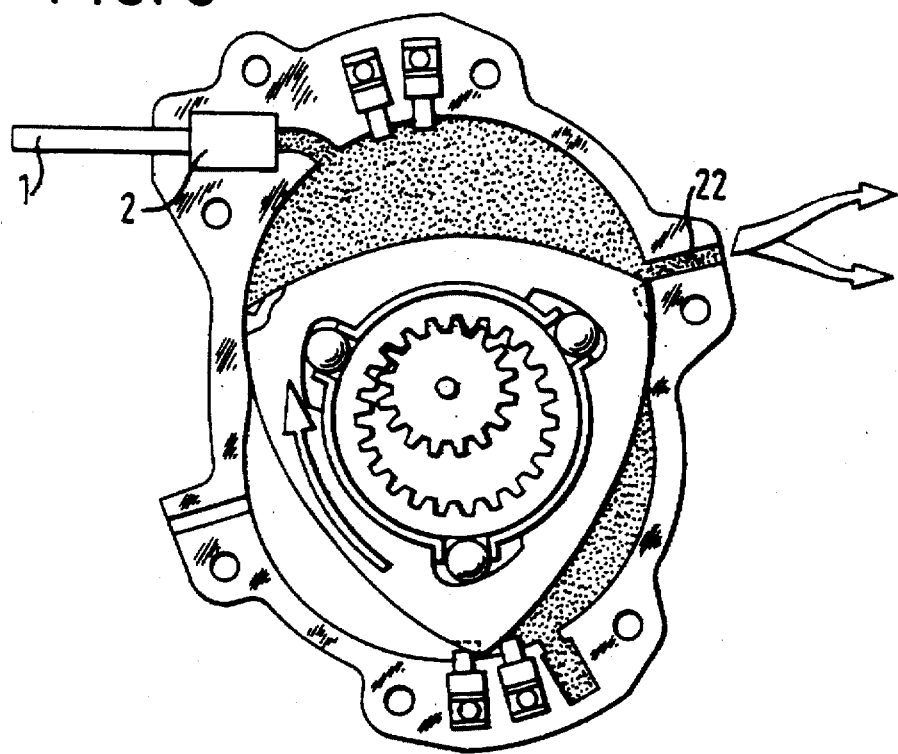
Figure 6:
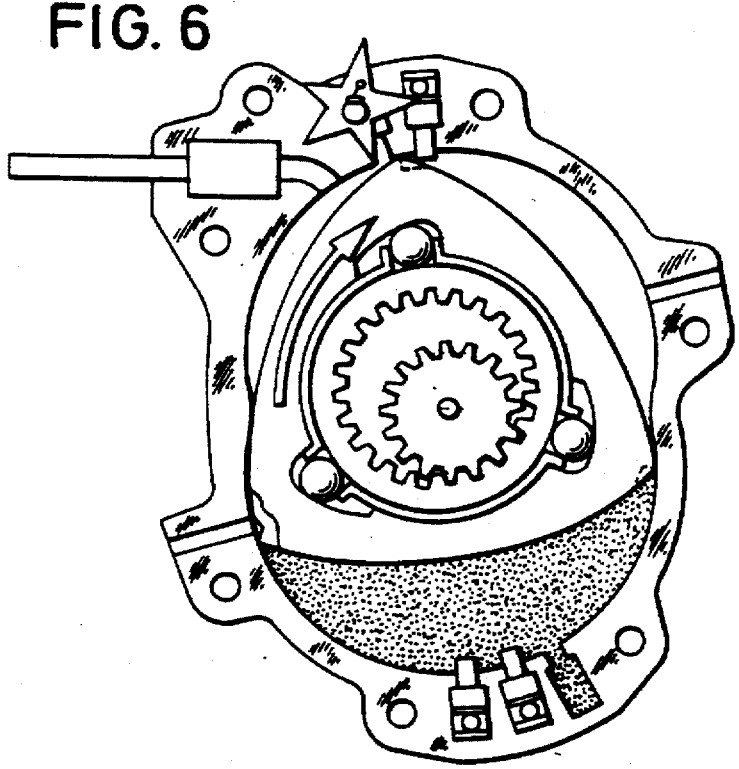
Figure 7:
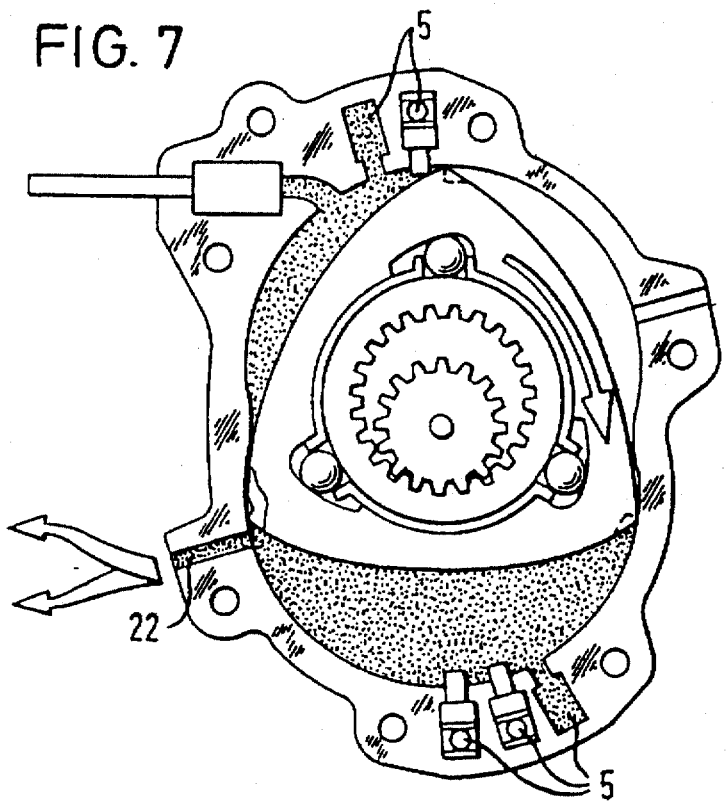

The rotation of the rotary piston is triggered by ignition, in particular electrical ignition, of the propulsion charge 2 in the gas generator (FIG. 3). As the rotary piston 4 revolves, successive propulsion charges 5 are ignited mechanically in the gas generator by mechanical means. However, it is also possible for an autoignition to take place as a result of the propulsion gas temperature prevailing in the expansion space 3. After having attained the maximum expansion volume, as illustrated in FIG. 4, one of the gas generators 5 is ignited in the second explosion chamber as illustrated in FIG. 5, and the rotary driving of the rotary piston is continued. After having attained the maximum expansion volume, exhaustion takes place in the respective expansion chamber through an exhaust 22 as illustrated in FIGS. 5 and 7. Due to the successive drive effects of the gas generators 5 the rotary piston may, where appropriate, also undergo a plurality of revolutions.

Due to the rotation of the rotary piston the clutch elements 14 in the form of spheres, as in the working example according to FIG. 1, are radially moved inwardly to be brought into frictional engagement with an internal ring gear 21. The internal ring gear 21 engages with a drive pinion 20 which is connected non-rotatably to the winding shaft 10. In this manner the rotary movement of the rotary piston 4 is transferred to the winding shaft in order to tension the belt. Due to the gear ratio between the internal ring gear and the drive pinion 20 a single revolution of the rotary piston 4 brings about multiple revolutions of the winding shaft. This gear ratio principle may also be employed in the embodiment illustrated in FIG. 1.

The embodiment illustrated in FIG. 8 comprises, serving as a rotary piston, a rotary piston 25 of circular cross-section. The rotary piston 25, when driven (direction of rotation 39) turns about its central axis 24. In the rotary piston 25 radially displaceable wings 26 (four in the case of the illustrated working example) are mounted. The outermost ends of the wings are forced against the trochoid internal configuration of the casing 8. For that purpose the wings 26 at their innermost ends are subjected to pressure supplied by the propulsion gas pressure in the expandable explosion chamber 3. This pressure is passed by way of pressure passages 27 from the respective expandable explosion chamber 3 into further explosion pressure spaces 28, 29, 30, 31 in which the inner ends of the wings are guided in a piston-like manner. Due to the wings 26 the respective expandable explosion chambers 3 (in the illustrated working example two explosion chambers each are provided) are each limited by a wing portion radially projecting from the rotary piston 25, a portion of the outer outlines of the circular rotary piston 25 and a portion of the trochoid inner profile of the casing 8. The likewise expandable pressure spaces 28 and 30 communicate with the expandable explosion chambers 3 by way of the respective two pressure passages 27.

Two ignition passages 40 are directed into the expandable explosion chambers 3. By way of these ignition passages 40 the propulsion gas pressure generated by one or more propulsion gas generators 5 is conducted. As long as the explosion chambers 3 expand during the piston rotation the wings 26 are pressed outwardly due to the propulsion gas pressure prevailing in the pressure spaces 28 and 30. This ensures a tight fit of the radial outer ends of the wings 26 against the inner trochoid contours of the casing 8.

On the rear of the wings 26 are in each case the compression chambers 41 of diminishing volume provided. The spent propulsion gas contained in the compression chambers 41 are expelled by way of the exhaust apertures 42. This also applies to the gases contained in the pressure spaces 29 and 31 which are forced out by way of the pressure spaces 27 into the respectively associated compression chambers 41 by the inner wing ends which are of piston-like design. Whilst in each case two wings 26 move during the expansion movement into a radially outer position, they move during the compression movement in the respective inner pressure spaces 28 to 31 towards a radially innermost position.

In the illustrated embodiment of FIG. 8 two expanding explosion chambers 3 are formed in each case into which the propulsion gases of the propulsion gas generator means 5 are conducted. In successive ignition cycles the propulsion gases are conducted successively by way of the propulsion gas passages 40 into the respective two expandable explosion chambers 3 formed during the piston rotation.

In FIGS. 9 and 10 a working example for the clutch mechanism is shown by means of which the torque supplied by the driven rotary piston 4 is transmitted by way of the winding shaft 10. The winding shaft 10 is mounted by way of an axial pivoting pin in a toe bearing 44 in a spring cassette 45 which accommodates a driving spring 46. The driving spring 46 with its inner end by way of a spring core 47 applies a spring bias to the bearing pin 43 of the winding shaft. The spring cassette 45 is fixed to a housing cover 32 which in turn is firmly fixed to the housing 8 of the rotary piston drive.

On the bearing pin 43 an eccentric shaft 34 is pivotally mounted as well as being pivotal in relation to the casing 8. The eccentric shaft 34 is connected non-rotatably to an disc 33. On the eccentric shaft 33 the rotary piston 4 is pivotally mounted about an eccentric axis 48. The rotary axis of the eccentric shaft 34 and the winding shaft axis 12 are in coaxial relationship. The eccentric axis 48 turns on a circle around the winding shaft axis 12 during the rotation of the rotary piston 4.

If the rotary piston 4 is revolved by the propulsion gases of the first propulsion charge 2 and the subsequent propulsion charges 5, the excenter shaft 34 is turned jointly therewith. Clutch rollers 35 are accommodated in a clutch cage 36 of the eccentric shaft 34. During turning of the excenter shaft 34 the clutch rollers 35 are moved radially outwardly so that they enter into force transmitting engagement with the clutch counter-surfaces 49 formed onto the winding shaft 10. In this manner the rotary movement of the rotary piston 4 is transmitted to the winding shaft 10.

The ignition of the two further propulsion charges 5 following onto the first propulsion charge takes place by means of pressure actuated ignition means 37. These each comprise an impact igniter 38 movable in piston-like manner in an ignition cage. The respective impact igniter 38 is subjected to the pressure in an expandable explosion chamber 3 by way of an ignition passage 50 and caused to impact onto the igniter of the gas generator 5. The igniter propulsion gases are then passed by way of the respective propulsion gas passage 51 into the expandable explosion chamber 3. Due to the rotation of the rotary piston 4 there is caused the successive ignition, each time at the correct instance, of the respective propulsion charge 5 and the piston is continuously driven onwards during the tensioning procedure.

I claim:

1. An apparatus for the rotary drive of a winding shaft of a safety belt automatic winding device, including an energy storing device, adapted to be triggered by a sensor means, a rotary member rotatable by the power storage means and a clutch by means of which the driven rotary member is to be engaged with the winding shaft, characterized in that the rotary member (4, 7) is rotatably accommodated in a casing (8), there being provided between the rotary member and an inner wall (11) of the casing (8) at least one explosion chamber (3) which turns around an axis (12) due to the rotation of the rotary member, and that, along the rotation trajectory of the explosion chamber (3) a plurality of energy storage means in the form of propellant gas charges (2, 5) are provided which can be triggered once the explosion chamber (3) has reached the respective locality of the propellant gas charge (2, 5) during the rotation of the rotary member (4, 7).

2. Apparatus according to claim 1, characterized in that the propellant gas charge (2) which at the beginning of the rotary movement of the rotary member (4, 7) is directed into the explosion chamber (3) is provided with an igniting means (1).

3. Apparatus according to claim 1, characterized in that at least one propellant gas charge (5) following onto the first propellant gas charge (2) in the course of the explosion chamber rotation is ignited by the propellant gas temperature prevailing in the explosion chamber (3) or mechanically by the rotary member.

4. Apparatus according to claim 1, characterized in that at least one propellant gas charge (5) following onto the first propellant gas charge (2) is ignited by an ignition means.

5. Apparatus according to claim 1, characterized in that the distance between successive propellant gas charges (2, 5) is less than the extent of the explosion chamber (3) in the direction of rotation.

6. Apparatus according to claim 1, characterized in that the propellant gas charges are ignited successively.

7. Apparatus according to claim 1, characterized in that, due to the successive propellant gas charges (2, 5) a progressive thrust is exercised on the rotary member (7).

8. Apparatus according to claim 1, characterized in that along the interior of the rotary member (4, 7) a clutch operating means (13) is provided.

9. Apparatus according to claim 1, characterized in that, due to the rotary movement of the rotary member (4, 7) clutch elements (14) are moved into a clutch engagement position in which a frictional force transmission between the winding shaft (10) and the rotary member (4, 7) is brought about.

10. Apparatus according to claim 9, characterized in that a guide means (9) for the clutch elements (14) is held stationarily in relation to the rotating rotary member (4, 7) until such time as the frictional engagement between the winding shaft (10) and the rotary member (7) has been established by the clutch elements (14).

11. Apparatus according to claim 1, characterized in that the rotary member (4, 7) comprises a cavity around its axis of rotation in which the clutch elements (14) are accommodated and into which an engagement member for the clutch elements (14), non-rotatably connected to the winding shaft (10), projects.

12. Apparatus according to claim 1, characterized in that the rotary member takes the form of a rotary piston (4).

13. Apparatus according to claim 1, characterized in that the rotary member takes the form of an impeller (7).

14. Apparatus according to claim 1, characterized in that the rotary member (7) is pivotally mounted circumferentially in relation to the cylindrical inner wall (11) of the casing (8) and wherein at least an explosion chamber (3) is provided on the periphery of the rotary member (7).

15. Apparatus according to claim 1, characterized in that the rotary member (7) is mounted rotatably coaxially in relation to the winding shaft (10) in the casing (8).

16. Apparatus according to claim 1, characterized in that the explosion chamber (3) expands during the revolving of the rotary member (4, 7).

17. Apparatus according to claim 1, characterized in that the casing (8) has a trochoidal inner configuration, wherein the rotary member is a circular rotary piston (25) revolving about its central axis (24), wherein on the rotary piston (25) radially outwardly movable wings (26) are mounted which outwardly fit against the trochoidal inner configuration of the casing (8) for defining the respective explosion chamber (3) and in the piston interior are subjected by way of an associated pressure passage (27) to the propellant gas pressure generated in the expanding explosion chamber (3) for the radially outwardly directed movement.

18. Apparatus according to claim 17, characterized in that in the piston interior expandable pressure chambers (28 to 31) are formed in which the respective inner ends of the wings subjected to the propellant gas pressure are guided for piston-like movement.

19. Apparatus according to claim 17, characterized in that an even number of wings (26) is mounted in the rotary piston (25) and wherein ignited propulsion gas is conducted successively into two explosion chambers (3) each formed by a wing (26), the outer configuration of the rotary piston (25) and the internal trochoidal configuration of the casing (8) and each expanding during the piston rotation.

20. Apparatus according to claim 1, characterized in that the ignition of the propellant charges (5) following onto the first ignited propellant charge (2) takes place by pressure sensitive ignition means (37) which are ignited during the piston rotation by the propellant gas pressure formed in the respective explosion chamber (3).

21. Apparatus according to claim 1, characterized in that the propellant gas charges are ignited simultaneously.

* * * * *

UNITED STATES PATENT AND TRADEMARK OFFICE
CERTIFICATE OF CORRECTION

PATENT NO. : 5 681 004
DATED : October 28, 1997
INVENTOR(S) : Martin Specht

It is certified that error appears in the above-indentified patent and that said Letters Patent is hereby corrected as shown below:

Column 6, line 26, after "which" delete --the--.

Column 6, line 39, change "1" to --14--.

Signed and Sealed this

Sixth Day of October, 1998

Attest:

BRUCE LEHMAN

*Attesting Officer*     *Commissioner of Patents and Trademarks*